United States Patent [19]

Marcuse

[11] Patent Number: 5,063,559
[45] Date of Patent: Nov. 5, 1991

[54] OPTIMIZED WAVELENGTH-DIVISION-MULTIPLEXED LIGHTWAVE COMMUNICATION SYSTEM

[75] Inventor: Dietrich Marcuse, Lincroft, N.J.

[73] Assignee: AT&T Bell Laboratories, Murray Hill, N.J.

[21] Appl. No.: 486,490

[22] Filed: Feb. 28, 1990

[51] Int. Cl.$^5$ .................. H04J 1/00; H04B 10/00
[52] U.S. Cl. .................................... 359/127
[58] Field of Search ............... 370/3; 455/618, 617, 455/606, 607, 610; 350/96.30

[56] References Cited

U.S. PATENT DOCUMENTS

| | | | |
|---|---|---|---|
| 4,244,045 | 1/1981 | Nosu et al. | 370/3 |
| 4,341,438 | 7/1982 | Seki et al. | 370/3 |
| 4,700,339 | 10/1987 | Gordon et al. | 370/3 |
| 4,715,679 | 12/1987 | Bhagavatula | 350/96.3 |
| 4,773,063 | 9/1988 | Hunsperger et al. | 370/3 |
| 4,831,616 | 5/1989 | Huber | 370/3 |
| 4,889,404 | 12/1989 | Bhagavatula et al. | 455/610 |
| 4,933,929 | 6/1990 | Tajima | 370/3 |

OTHER PUBLICATIONS

R. H. Stolen et al., IEEE J. of Quant. Elec., vol. QE-18, No. 7, Jul. 1982, "Parametric Amplification and Frequency . . . ", pp. 1062-1072.

K. O. Hill et al., J. Appl. Phys., vol. 49, No. 10, Oct. 1978, "CW Three-Wave Mixing in Single-Mode Optical Fibers", pp. 5098-5106.

E. J. Bachus et al., Electronics Letters, vol. 21, No. 25/16, Dec. 5, 1985, "Coherent Optica-Fibre Subscriber Line", pp. 1203-1205.

T. G. Hodgkinson et al., Br. Telecom Tech. J., vol. 3, No. 3, Jul. 1985, "Coherent Optical Fibre Transmission Systems", pp. 5-18.

H. Toba et al., Electronics Letters, vol. 21, No. 15, Jul. 18, 1985, "450 Mbit/s Optical Frequency-Division-Multiplexing . . . ", pp. 656-657.

E. J. Bachus et al., Electronics Letters, vol. 21, No. 1, Jan. 3, 1985, "Two-Channel Heterodyne-Type Transmission Experiment", pp. 35-36.

N. Shibata et al., IEEE J. Quantum Elec., vol. QE-23, No. 7, Jul. 7, 1987, "Phase-Mismatch Dependence of Efficiency of Wave . . . ", pp. 1205-1210.

*Primary Examiner*—Reinhard J. Eisenzopf
*Assistant Examiner*—Kinfe-Michael Negash
*Attorney, Agent, or Firm*—Gregory C. Ranieri

[57] ABSTRACT

Unwanted, monotonic growth of sideband energy is avoided in wavelength-division-multiplexed and frequency-division-multiplexed lightwave communication systems by transmitting adjacent channels approximately 2 nm to 3 nm apart in the normal dispersion regime of the optical fiber for the system and by transmitting each channel more than 0.4 nm below a mean zero dispersion wavelength, $\lambda_0$, of the optical fiber. Interchannel spacing and individual channel separation from the zero dispersion wavelength are measured with respect to a nominal carrier wavelength for each channel.

10 Claims, 11 Drawing Sheets

$(f-f_0)/(f_{max}-f_0)$ $(f-f_0)/(f_{max}-f_0)$

OPTIMIZED WAVELENGTH-DIVISION-MULTIPLEXED LIGHTWAVE COMMUNICATION SYSTEM

TECHNICAL FIELD

This invention relates to wavelength-division-multiplexed lightwave communication systems and, more particularly, to such systems in which one or more carrier signals are transmitted at a wavelength of zero dispersion for the dielectric waveguide transmission medium of the system.

BACKGROUND OF THE INVENTION

Optical fibers are generally accepted as the transmission medium for most long distance lightwave communication systems. Theoretically, because of almost unlimited bandwidth, fibers can transport thousands of very high speed data channels simultaneously. Realistically, however, loss, dispersion, and nonlinear intensity-dependent effects combine to determine both the number of channels supported by the fiber and the spectral placement of the channels on the fiber. In an effort to reach a maximum data throughput rate, most communication systems are designed as wavelength-division multiplexed (WDM) or frequency-division-multiplexed (FDM) systems having carrier signals transmitted at and in close proximity to a benchmark transmission characteristic for the optical fiber, namely, the zero dispersion wavelength, $\lambda_0$. This wavelength is defined as the point at which the second derivative of the propagation constant for the fiber taken with respect to wavelength is zero. Standard single-mode fibers exhibit zero dispersion nominally at 1.3 $\mu$m, while dispersion-shifted fibers have a zero dispersion point at approximately 1.5 $\mu$m.

While it has remained a foregone conclusion that one carrier in a WDM or FDM system be transmitted at the zero dispersion wavelength, the placement of other carriers for adjacent channels has been a subject of important study. In fact, several researchers have modeled the problem of carrier placement as a three-wave or four-wave mixing problem to account for nonlinear effects arising when intense lightwave signals propagate in the optical fiber. See, K. O. Hill et al., *J. Appl. Phys.*, 49(10), pp. 5098–5106 (1978) and N. Shibata et al.,*IEEE J. Quant. Elect.*, Vol. Qe-23, No. 7, pp.1205–1210 (1987). Both Hill et al. and Shibata et al. describe processes in which three input lightwave signals with different frequencies generate lightwave signals at as many as nine corresponding new frequencies. The new lightwave signals result from frequency mixing or crosstalk. Shibata et al. conclude by extrapolating their results from experiments at short wavelengths that, in a frequency multiplexed transmission system with one narrow linewidth carrier signal at the zero chromatic dispersion wavelength of the fiber, transmission of adjacent lightwave signals should occur with frequency separations greater than 400 GHz (2.25 nm) at $\lambda_0=1.3$ $\mu$m and greater than 300 GHz (2.4 nm) at $\lambda_0=1.5$ $\mu$m to achieve complete suppression of lightwave signals generated through four-wave mixing. It is now understood by me that the conclusion by Shibata et al. is flawed and that complete suppression does not occur in the frequency multiplexed system described by Shibata et al.

SUMMARY OF THE INVENTION

Unwanted, monotonic growth of sideband energy is avoided in wavelength-division-multiplexed and frequency-division-multiplexed lightwave communication systems by transmitting adjacent channels approximately 2 nm or more apart in the normal dispersion regime of the optical fiber and by transmitting each channel more than 0.4 nm below a mean zero dispersion wavelength, $\lambda_0$, of the optical fiber. Interchannel spacing and individual channel separation from the zero dispersion wavelength are measured with respect to a nominal carrier wavelength for each channel.

Each transmitter in the wavelength-division-multiplexed or frequency-division-multiplexed lightwave communication system includes a plurality of modulated light sources allocated on the basis of one per channel, wherein each light source is tuned to a particular wavelength in accordance with the desired interchannel spacing and individual separation from the zero dispersion wavelength. Light sources include tunable and fixed wavelength lasers modulated directly or externally.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
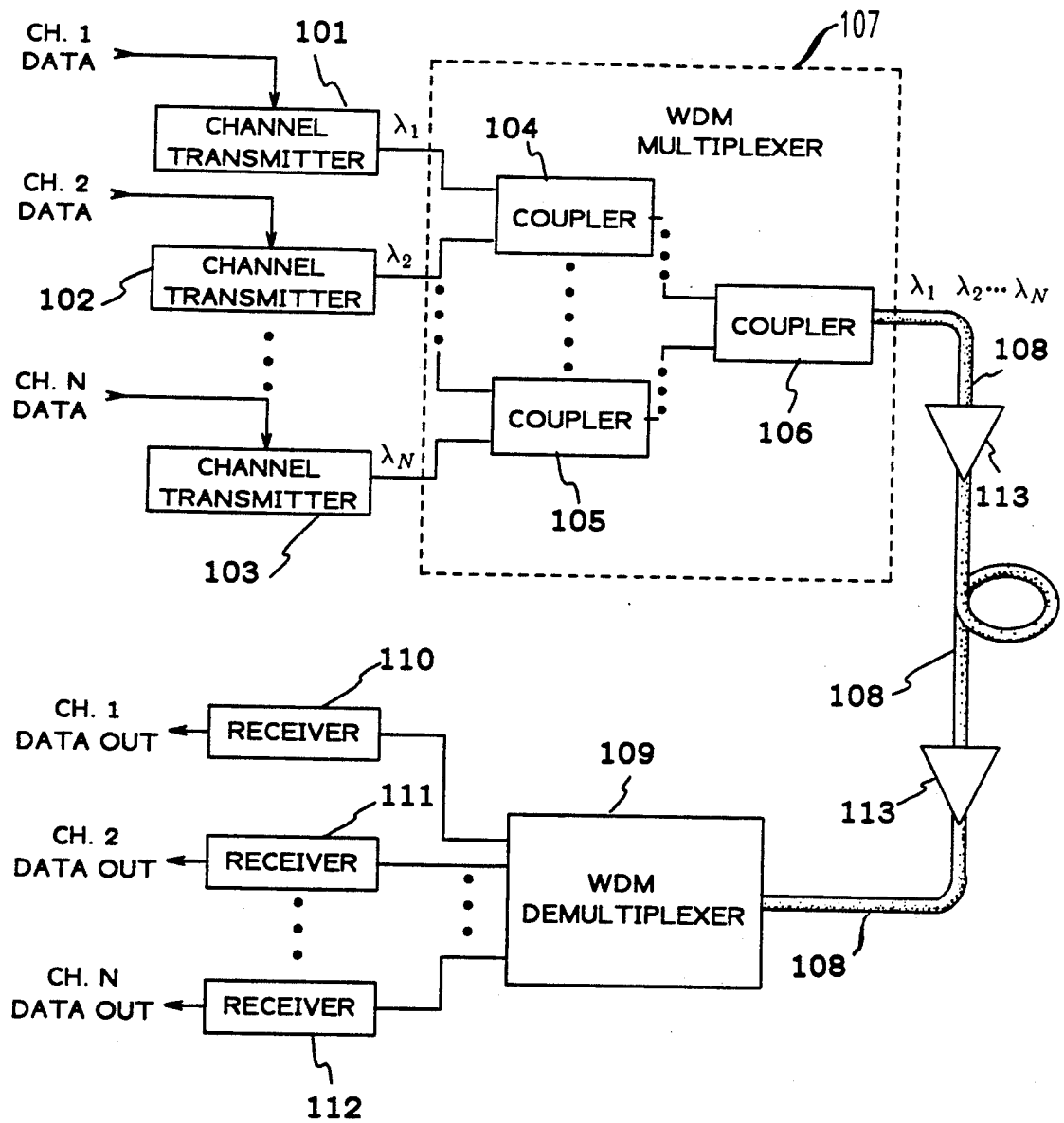
FIG. 1 is a simplified block diagram for the lightwave communication system in accordance with the principles of the invention.

Lightwave signal transmission over very long distances is encumbered by the usual problems caused by loss and dispersion in the optical fiber. In addition, such transmission is effected by a weak dependence of the fiber material refractive index on the intensity of each lightwave signal. This dependence is nonlinear and can be expressed as $n = n_0 + n_2 \cdot |E|^2$, where $n_0$ represents the linear part of the refractive index, $n_2$ represents the nonlinear part of the refractive index, and E is the power density of the lightwave signal.

Dependence of refractive index on the intensity of the lightwave signal induces a change of the group velocity for that lightwave. The refractive index change also leads to self phase modulation or self chirping of the lightwave signal which influences pulse shape via interaction of pulses from the lightwave signal with the fiber dispersion. Self phase modulation and dispersion cancel completely during soliton formation. When cancellation is incomplete, self phase modulation leads to spectral broadening and, as a result, additional pulse distortion.

In accordance with the principles of the present invention, the signal distorting influence of the weak refractive index nonlinearity in optical fibers is minimized for lightwave signals traveling distances comparable to present transoceanic spans. This is achieved in a multi-channel wavelength division multiplexed (WDM) lightwave communication system by transmitting adjacent channels approximately 2 nm or more apart in the normal dispersion regime of the optical fiber and also by transmitting each channel more than 0.4 nm below the zero dispersion wavelength, $\lambda_0$, of the optical fiber. While the interchannel separation may be large, it has been determined from simulation results that an interchannel separation between 2 nm and 3 nm is desirable for a WDM lightwave system having at least two channels bearing ASK modulated information. A large interchannel separation is permitted by employing fixed or adaptive equalization elements at the receive end of the communication system. Equalization elements known in the art have both electronic and fiber realizations.

With respect to the separation of the first channel from the zero dispersion wavelength, it has been found from simulation that the closer one channel wavelength is to the zero dispersion wavelength, the more distortion is introduced into the other channel for a 2-channel WDM lightwave system. When viewed as frequency spectra, it is seen that intermodulation increases and causes significant amounts of noise to occur across the wavelength band of interest. As the first channel is farther from the zero dispersion wavelength, it is understood that both channels of a 2-channel system undergo considerably more dispersion.

It should be noted that the following conventions will be followed in this description for purposes of clarity and not for purposes of limitation. Wavelength division multiplexing is understood to encompass standard WDM and frequency division multiplexing (FDM). Generally, WDM is understood to be the same as FDM. Optical fiber is understood to include such types of optical fiber as standard circular core, single mode fiber, dispersion shifted fiber, polarization maintaining or polarization preserving fiber, and the like. Other conventions are set forth in the description below.

An exemplary multi-channel WDM lightwave communication system is shown in FIG. 1. Each channel supplies data to a related channel transmitter. Data from channel 1 are supplied to channel transmitter 101; data from channel 2 are supplied to channel transmitter 102; and data from channel N are supplied to channel transmitter 103. Channel transmitters 101 to 103 include sufficient elements well known to those skilled in the art for generating lightwave signals modulated by the respective channel data. In an exemplary embodiment, the channel transmitter includes a single wavelength laser diode such as a distributed feedback laser coupled optically through an optical isolator to an external modulator. The laser diode is suitably biased and controlled to operate in a continuous-wave (CW) mode at the single wavelength which is known herein as a carrier wavelength for the channel of interest. CW lightwave signals from the laser diode are modulated by the channel data in the external modulator to generate the modulated lighwave signal. The modulated lightwave signals associated with a particular channel have a generally wider bandwidth than the unmodulated laser diode signal but, for purposes of ease in description, such signals are considered to be nominally at the associated carrier wavelength.

The transmitter apparatus shown in FIG. 1 also includes a WDM multiplexer 107 to combine the separate modulated lightwave signals into a single signal for transmission on optical fiber 108. As such, multiplexer 107 is an N×1 device which accepts N different inputs and converts them to a single output. All input wavelengths are present in the output signal from multiplexer 107. WDM multiplexer 107 includes couplers such as 3 dB couplers to combine pairs of lightwave signals at different wavelengths into a single output lightwave signal.

The multi-wavelength signal output from WDM multiplexer 107 is input to optical fiber 108. While the fiber is depicted simplistically as a single length in FIG. 1, it will be appreciated by those individuals skilled in the art that optical fiber 108 may comprise a plurality of long spans (10 km or longer) of fiber separated from one another by individual amplifiers, repeaters or regenerators to achieve long distance communication. In this context, long distance is understood to mean distances greater than 100 km, for example. It should be understood by those persons skilled in the art that this invention is particularly applicable to long distance WDM systems spanning desirably more than 1000 km because it is generally accepted that the fiber nonlinearity only becomes significant over such very long distances. Transmission over very long distances is improved by spacing optical amplifiers along the length of the fiber to compensate intrinsic fiber loss. Several amplifiers have been shown in FIG. 1 along the length of fiber 108. Standard optical amplifiers such as semiconductor amplifiers and doped-fiber amplifiers may be employed for amplification and loss compensation along the length of fiber 108.

In the WDM lightwave communication system, multiplexed signals output from fiber 108 are supplied to WDM demultiplexer 109. WDM demultiplexer 109, as shown in FIG. 1, separates the different channels according to wavelength so that the signal on carrier wavelength $\lambda_1$ is sent to receiver 110, the signal on carrier wavelength $\lambda_2$ is sent to receiver 111, and so on through the signal on carrier wavelength $\lambda_N$ which is sent to receiver 112. Receivers 110 through 112 detect and process the received lightwave signal information to produce a data output signal for each particular channel of interest.

Figure 2:
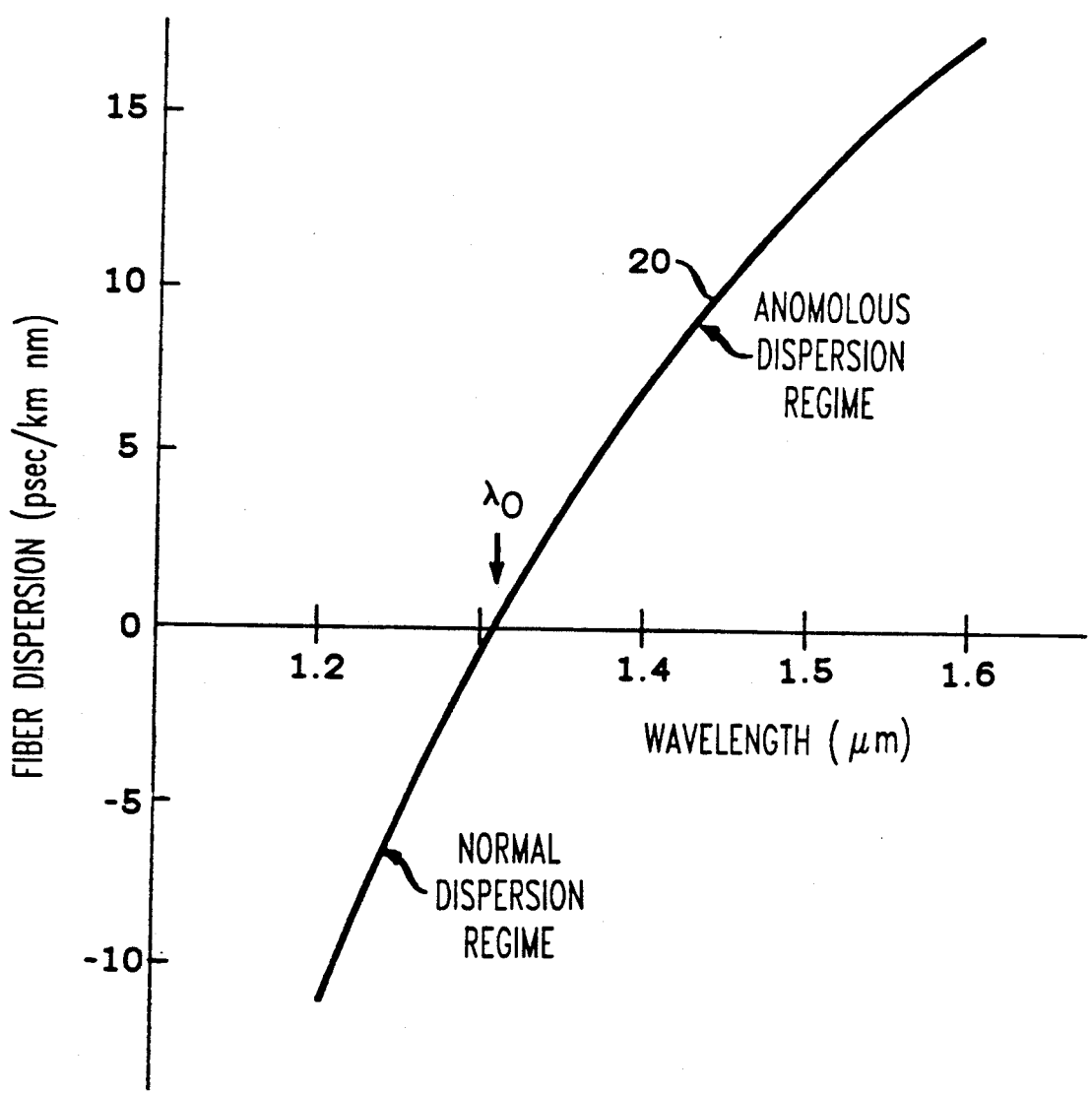
FIG. 2 shows a plot of fiber dispersion versus wavelength for a standard single-mode fiber.

FIG. 2 shows the variation of dispersion with respect to wavelength for a standard optical fiber such as fiber 108. Two distinct regimes are noted on curve 20, namely, the anomalous dispersion regime (D>0) and the normal dispersion regime (D<0). Curve 20 is shown crossing through a point of zero dispersion at wavelength $\lambda_0$. This wavelength is the so-called zero dispersion wavelength. Of course, in dispersion-shifted fibers, this crossing occurs at a longer wavelength ($\approx 1.5$ $\mu$m). As described above, prior art WDM lightwave communication systems have been designed to take advantage of the zero dispersion wavelength by launching one channel of the WDM signal into the fiber at a carrier wavelength $\lambda_0$. In contrast and in accordance with the principles of the present invention, no channel carrier is launched at the zero dispersion wavelength. Rather, carrier wavelengths of adjacent channels are separated by approximately 2 nm or more and the carrier wavelength of each channel is separated at least 0.4 nm away from the zero dispersion wavelength.

Figure 3:
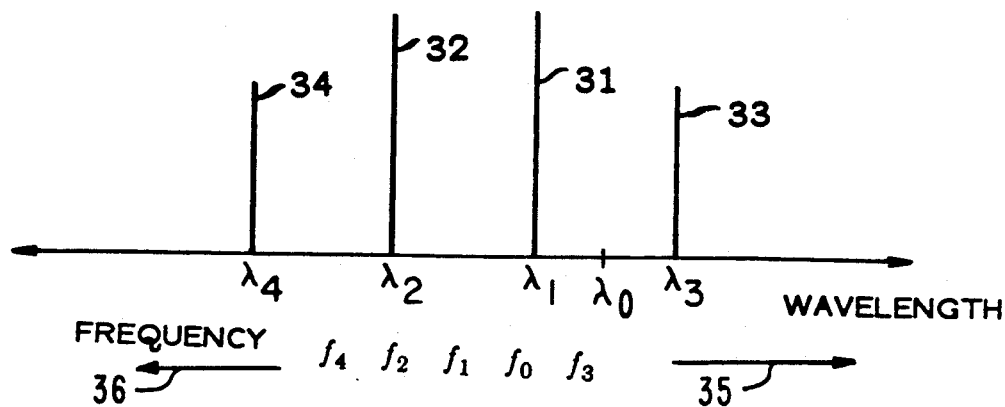
FIG. 3 shows the relationship between channel carriers and intermodulation sidebands for a 2-channel wavelength division multiplexed lightwave communication system.

Interchannel spacings and separation from the zero dispersion wavelength is depicted for a 2-channel WDM lightwave communication system in FIG. 3. As shown, channels 1 and 2 are transmitted at carrier wavelengths $\lambda_1$ and $\lambda_2$, respectively. Channel 1 is shown as signal line 31 and channel 2 is shown as signal line 32. The spacing between these channels and the separation from the zero dispersion wavelength, $\lambda_0$, are in accordance with the teachings of the present invention. Four photon mixing causes intermodulation or mixing signals to occur at wavelengths $\lambda_3$ and $\lambda_4$. The intermodulation sideband signals are referred to as intermodulation channel 3 shown as signal line 33 and intermodulation channel 4 is shown as signal line 34. Arrow 35 shows the direction of increasing wavelength.

Alternatively, the relationships shown in FIG. 3 can be viewed in terms of frequency according to the equation $f_i = c/\lambda_i$, for i=1, 2, 3, and 4. Channels 1 and 2 are transmitted at carrier frequencies $f_1$ and $f_2$, respectively. Channel 1 is shown as signal line 31 and channel 2 is shown as signal line 32. The spacing between these channels and the separation from the zero dispersion frequency, $f_0$, are in accordance with the teachings of the present invention. Four photon mixing causes intermodulation or mixing signals to occur at frequencies $f_3$ and $f_4$. The intermodulation sideband signals are referred to as intermodulation channel 3 shown as signal line 33 and intermodulation channel 4 is shown as signal line 34. Arrow 36 shows the direction of increasing frequency.

Four photon mixing causes the intermodulation channels to occur at well-defined wavelengths or frequencies. For the 2-channel WDM system described above, the relationships between the channels may be expressed as follows:

$$f_3 = 2f_1 - f_2,$$

and $$f_4 = 2f_2 - f_1.$$

Of course, these relationships are easily converted to wavelength relationships by employing the standard relationship that $\lambda_i = c/f_i$, where i=1, 2, 3, or 4 and $f_i$ is the frequency for channel i and c is the speed of light in a vacuum.

Figure 4:
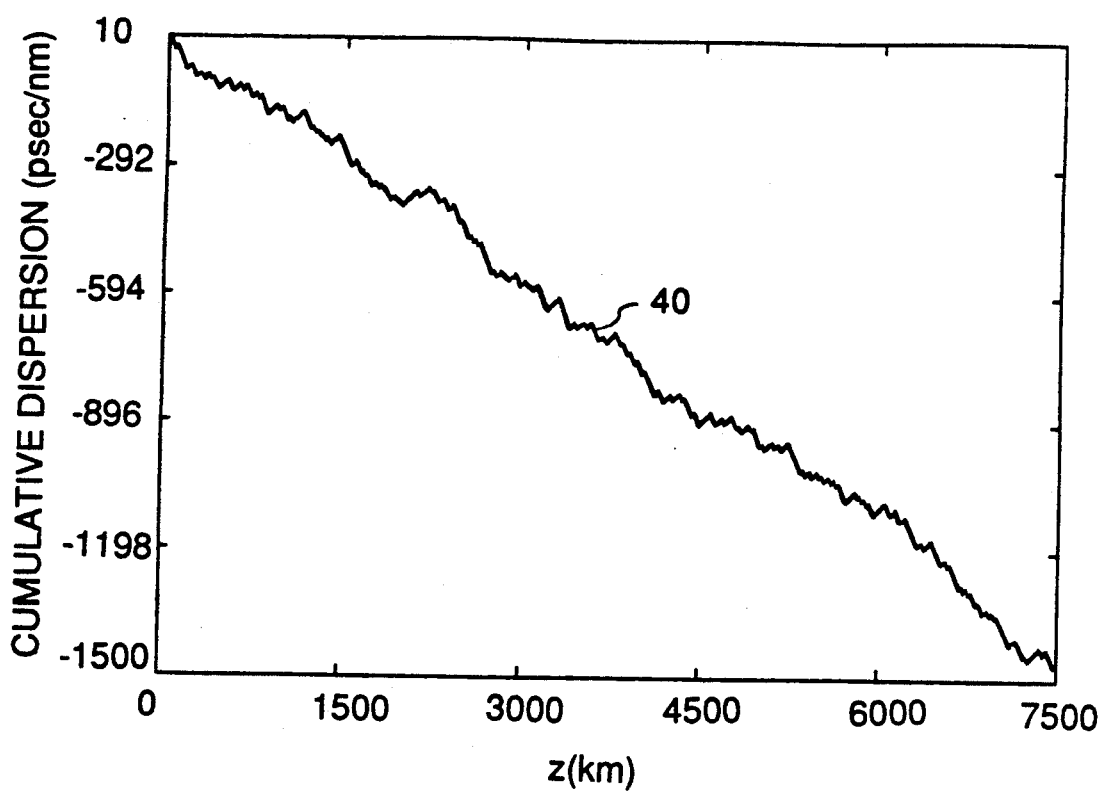
FIG. 4 shows a graph of cumulative random dispersion as a function of position on the fiber.

Channel spacing and zero dispersion separation conditions set forth above contemplate that optical fiber 108 has a substantially uniform zero dispersion characteristic from one end to the remote end. That is, the average value of dispersion is substantially equal to or in the proximate neighborhood of the actual dispersion at any position along the fiber. Alternatively, the magnitude of cumulative dispersion for fiber 108 tends to grow in a substantially random linear manner. An exemplary dispersion characteristic displaying substantial uniformity is shown as curve 40 in FIG. 4 plotted versus distance along the fiber, z. The units for cumulative dispersion are psec/nm. In the context of this description, dispersion is understood to mean the change in pulse delay with change in wavelength per unit fiber length. Dispersion is normally expressed in units of psec/nm.km. Unless specified expressly to the contrary, a substantially uniform dispersion characteristic is contemplated for fiber 108 in the description below. The point of zero dispersion for most optical fibers varies randomly along the fiber length so that the entire fiber has its zero dispersion parameter characterized as a mean zero dispersion wavelength.

Figure 5:
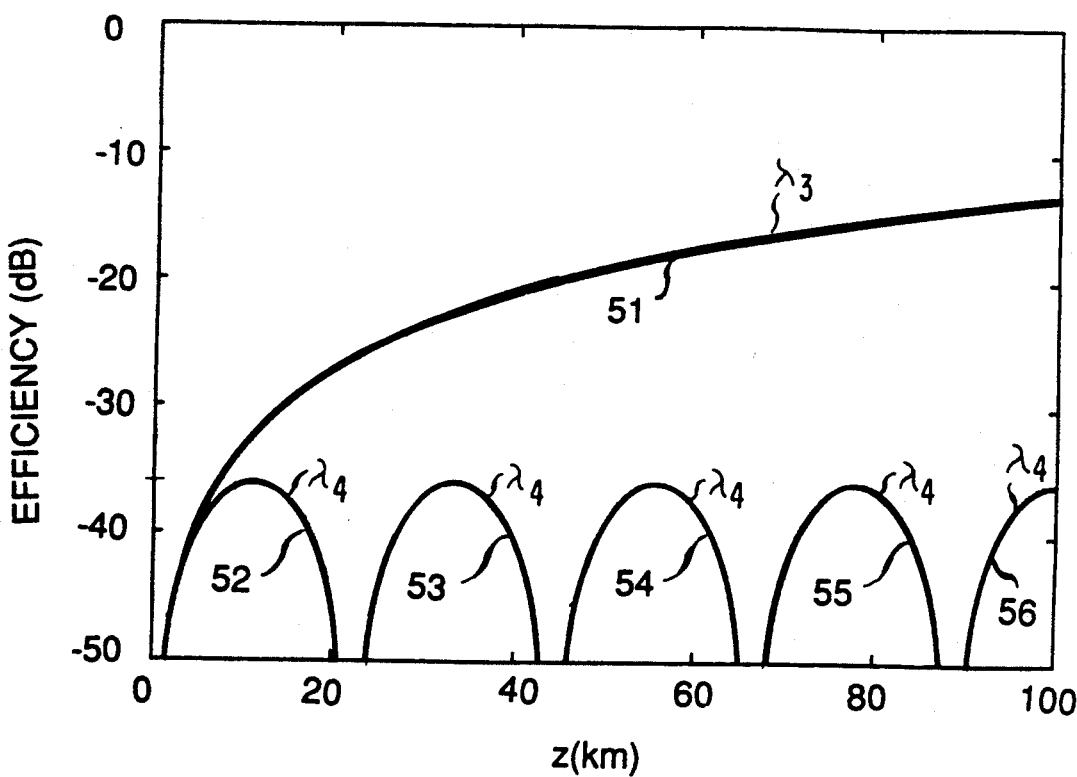
FIG. 5 shows a plot of spurious sideband signals produced by four photon mixing of two primary sinusoidal waves.

In order to appreciate the benefits derived from designing a WDM lightwave communication system in accordance with the principles of the invention, it is important to understand the manner in which systems designed according to prior rules operate. That is, it is important to understand the effect of four photon mixing on the intermodulation sidebands when one channel of the WDM system has its carrier positioned at the zero dispersion wavelength. By choosing a constant amplitude for the wave envelope function of each channel, it is possible to obtain an expression which shows that the power in the upper intermodulation sideband at $\lambda_3$ increases monotonically with distance while the spurious signal in the lower sideband at $\lambda_4$ oscillates. This behavior is shown in FIG. 5 where curve 51 shows the monotonic growth in the upper sideband intermodulation signal and curves 52 through 56 show the oscillatory nature of the spurious signals in the lower sideband.

Figure 6:
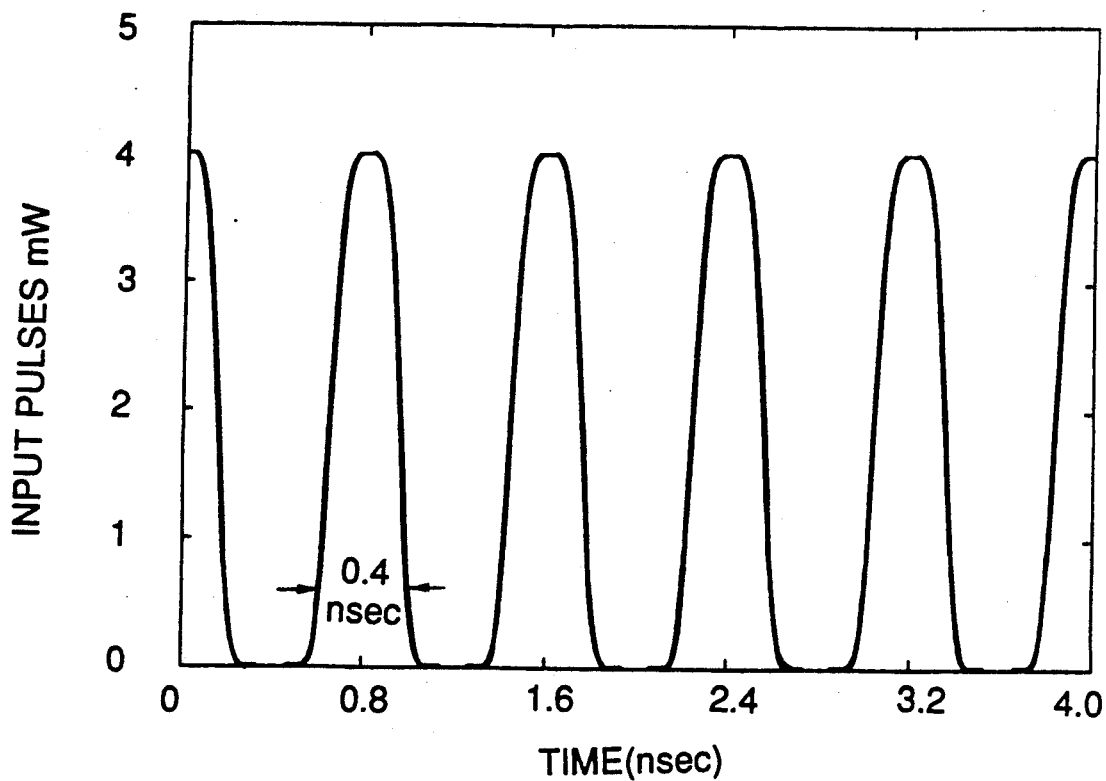
FIG. 6 shows a sequence of exemplary input data pulses for a channel in the WDM lightwave communication system.

FIG. 6 shows a data sequence of pulses for each channel. The sequence represents an alternating stream of "zeros" and "ones" having substantially identical duration spacing and power. The data rate represented by the sequence is 2.5 Gbps. The data sequence modulates the lightwave signal from each channel transmitter so that one sequence is ASK-modulated onto the carrier at wavelength $\lambda_1$ and the same sequence is modulated onto the carrier at wavelength $\lambda_2$. When carrier wavelength $\lambda_1$ coincides with the zero dispersion wavelength $\lambda_0$ and when carrier wavelength $\lambda_2$ is separated from $\lambda_1$ by three nanometers, output pulses shown in FIGS. 7 through 10 appear at the end of the optical fiber. In an experimental simulation, optical fiber 108 comprised long sections of optical fiber spliced together and compensated at approximately 100 km intervals by suitable optical amplification. The fiber was modeled to be approximately 7500 km in total length (i.e., a transoceanic distance) with an intrinsic loss of 0.21 dB per km and effective mode area of 80 $\mu$m.

Figure 7:
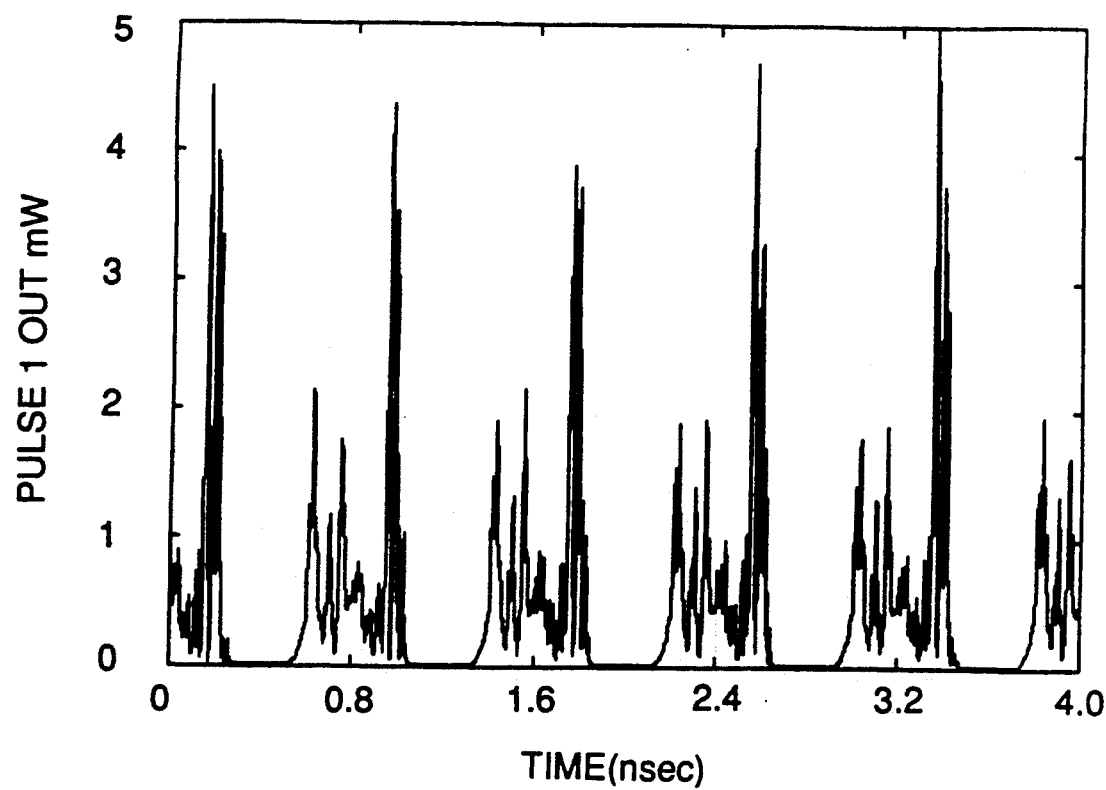
FIGS. 7 through 10 show output pulses for a 2-channel WDM lightwave communication system for both channels and the sideband intermodulation channels when one carrier wavelength is positioned at the zero dispersion wavelength of the optical fiber.
Figure 8:
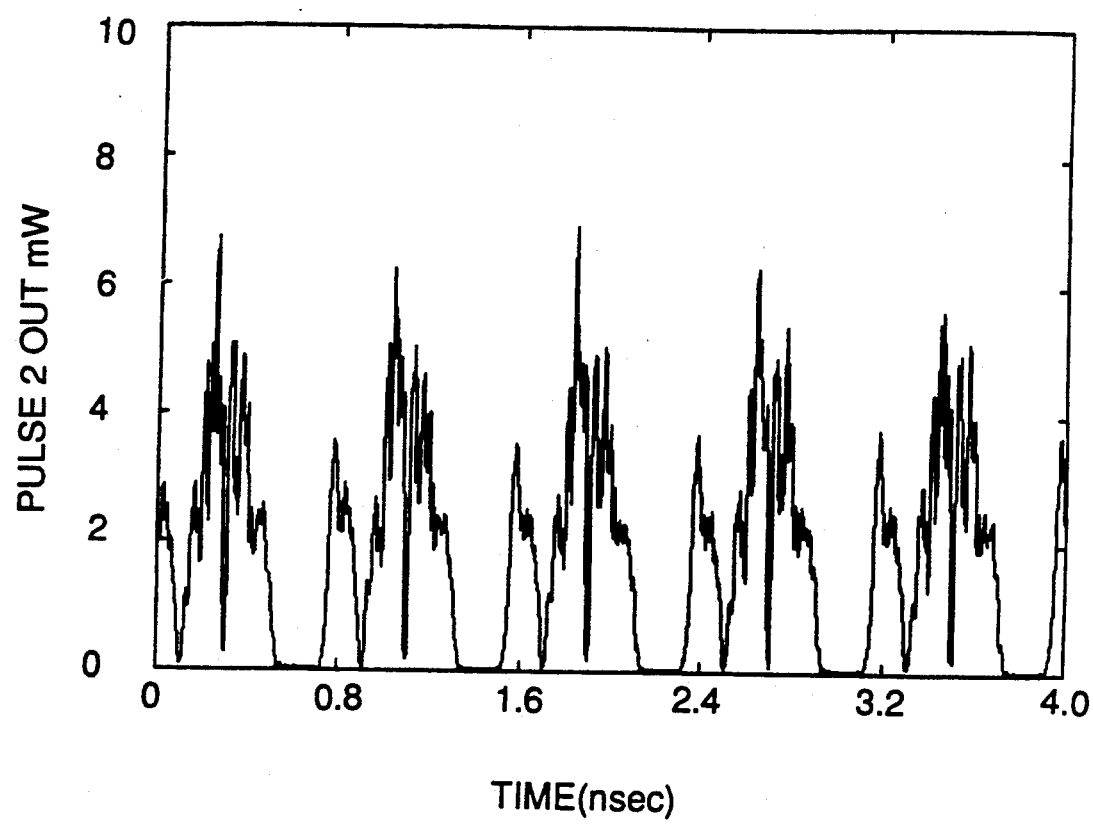
Figure 9:
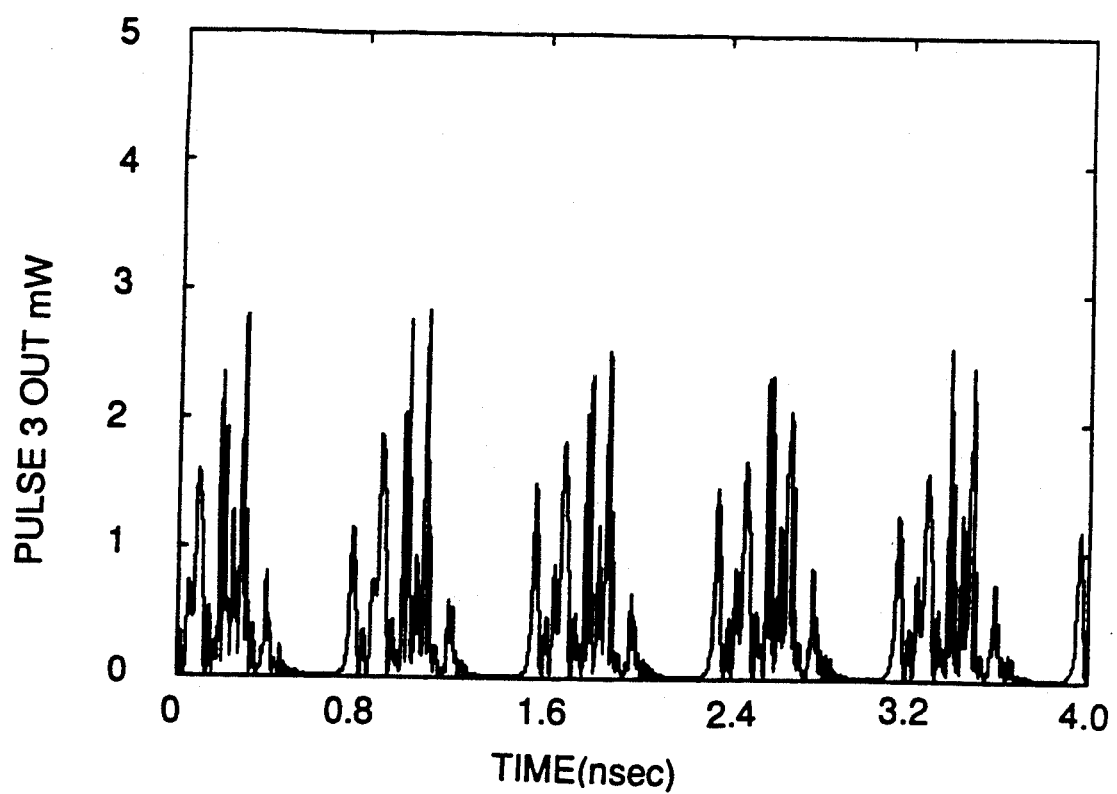
Figure 10:
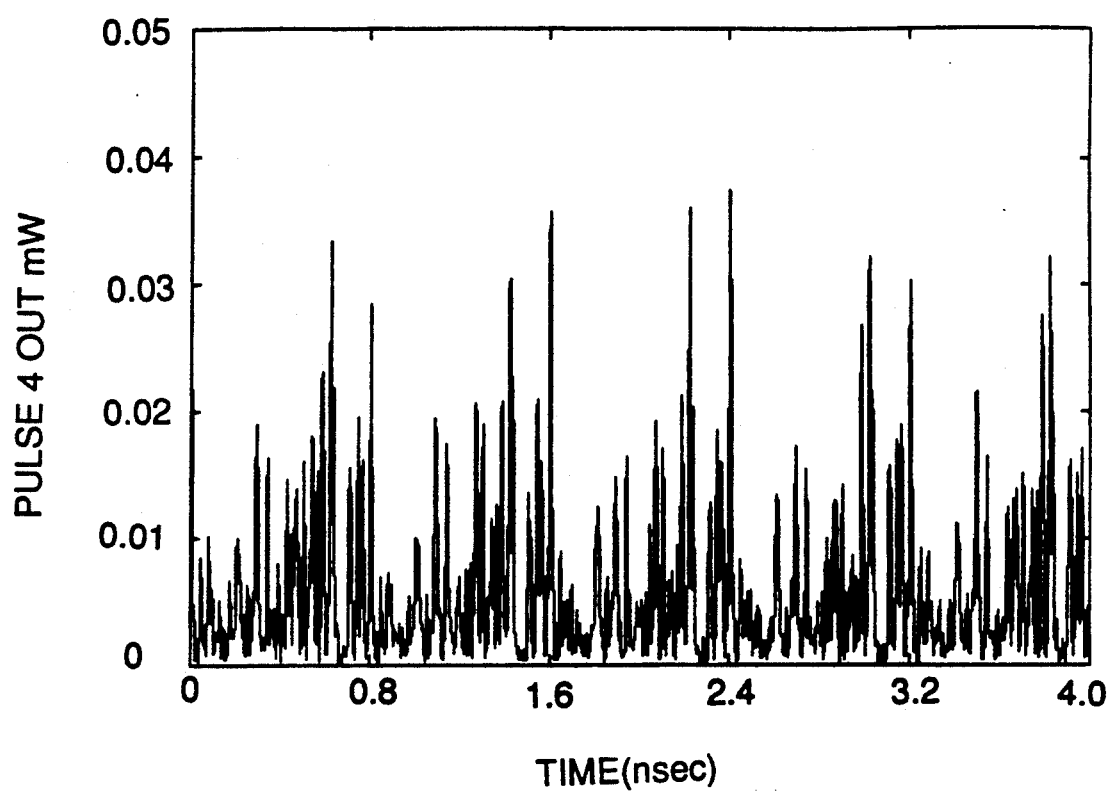

The pulses shown in FIG. 7 correspond to the received signal in channel 1 at carrier wavelength $\lambda_1$. Similarly, the pulses shown in FIG. 8 correspond to the received signal in channel 2 at carrier wavelength $\lambda_2$. Pulses for the intermodulation sidebands at carrier wavelengths $\lambda_3$ and $\lambda_4$ are shown in FIGS. 9 and 10, respectively. It is clear from these figures that the data sequence in each channel is severely corrupted. It is also important to note that the instantaneous power for individual pulses in the upper intermodulation sideband is two orders of magnitude greater than the instantaneous power for individual pulses in the lower intermodulation sideband. It should be noted that the terms "upper" and "lower" have beendesignated for the sidebands in terms of wavelength. If the sidebands were designated in terms of frequency, the upper sideband for wavelength would become the lower sideband in frequency and, similarly, the lower sideband for wavelength would become the upper sideband in frequency.

Figure 11:
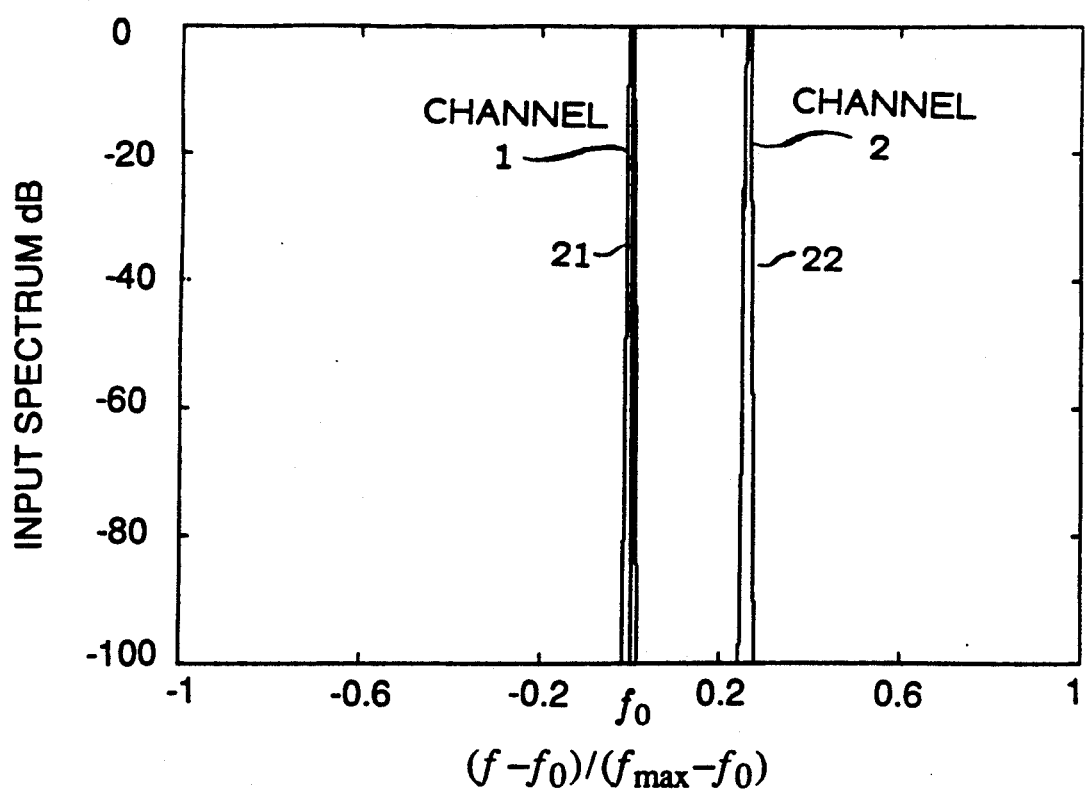
FIGS. 11 and 12 show input and output spectra, respectively, for the signals described in FIGS. 6 through 10.
Figure 12:
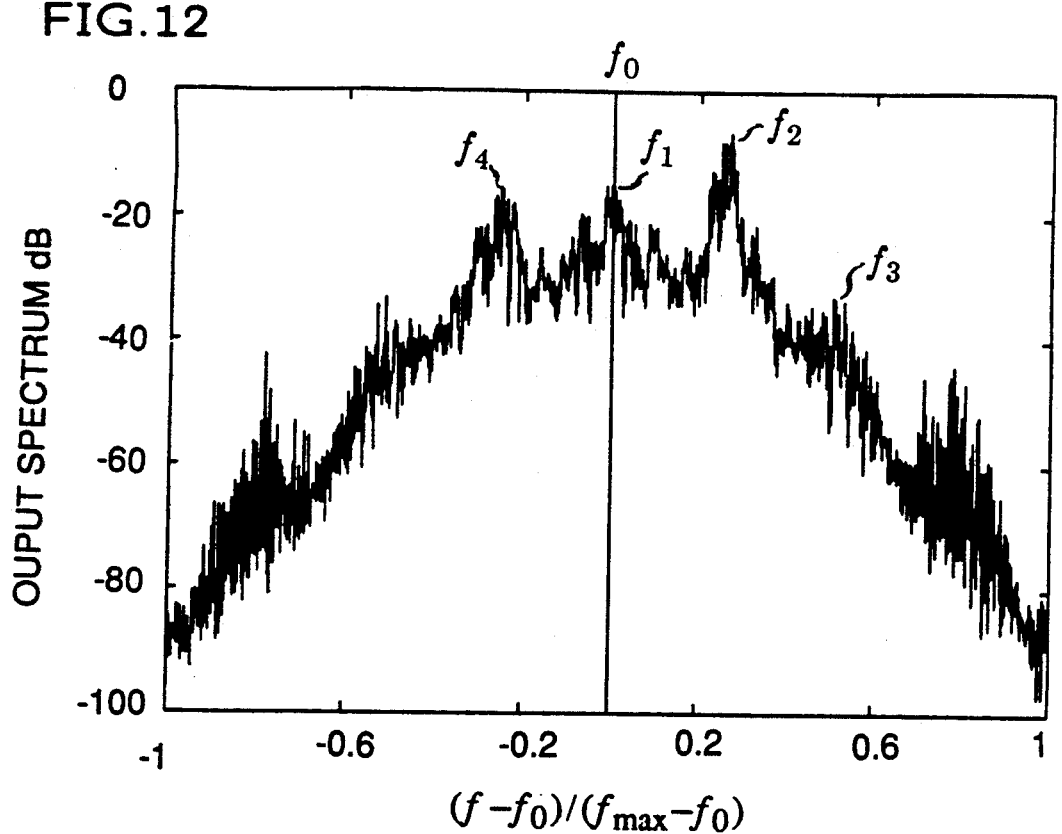

Input and output frequency spectra are shown in FIGS. 11 and 12. Because of the inverse relationship between frequency and wavelength ($f_i = c/\lambda_i$), curve 21 corresponds to the input spectrum for channel 1 at the zero dispersion frequency (i.e., $f_1 = f_0$) and curve 22 corresponds to the input spectrum for channel 2 spaced approximately 2 nm from channel 1. The frequency axis in each of the figures is normalized to dimensionless units by choosing $f-f_0$ as the distance from the zero dispersion frequency and by setting $f_{max}-f_0$ equal to 1000 GHz. As anticipated from viewing the output data pulse sequences in FIGS. 7 through 10, one readily sees in FIG. 12 that the lower intermodulation sideband at $f_3$ has increased, after traversing fiber 108, to a value substantially equal in magnitude to that of channel 1. Clearly, this leads one to conclude that the WDM system performance is severely degraded when one channel has its carrier frequency (wavelength) positioned at the zero dispersion frequency (wavelength) of the fiber.

Figure 13:
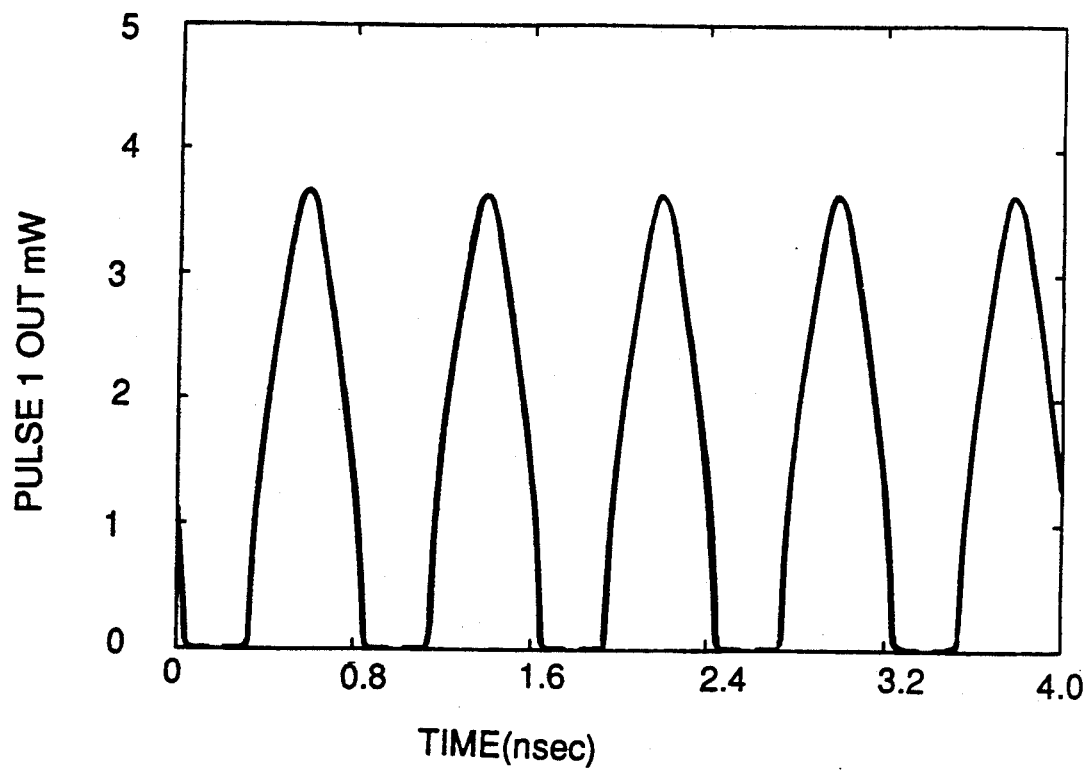
FIGS. 13 through 18 show output signals for a 2-channel WDM lightwave communication system for both channels and the sideband intermodulation channels when one carrier wavelength is positioned away from the zero dispersion wavelength of the optical fiber in accordance with the principles of the invention.
Figure 14:
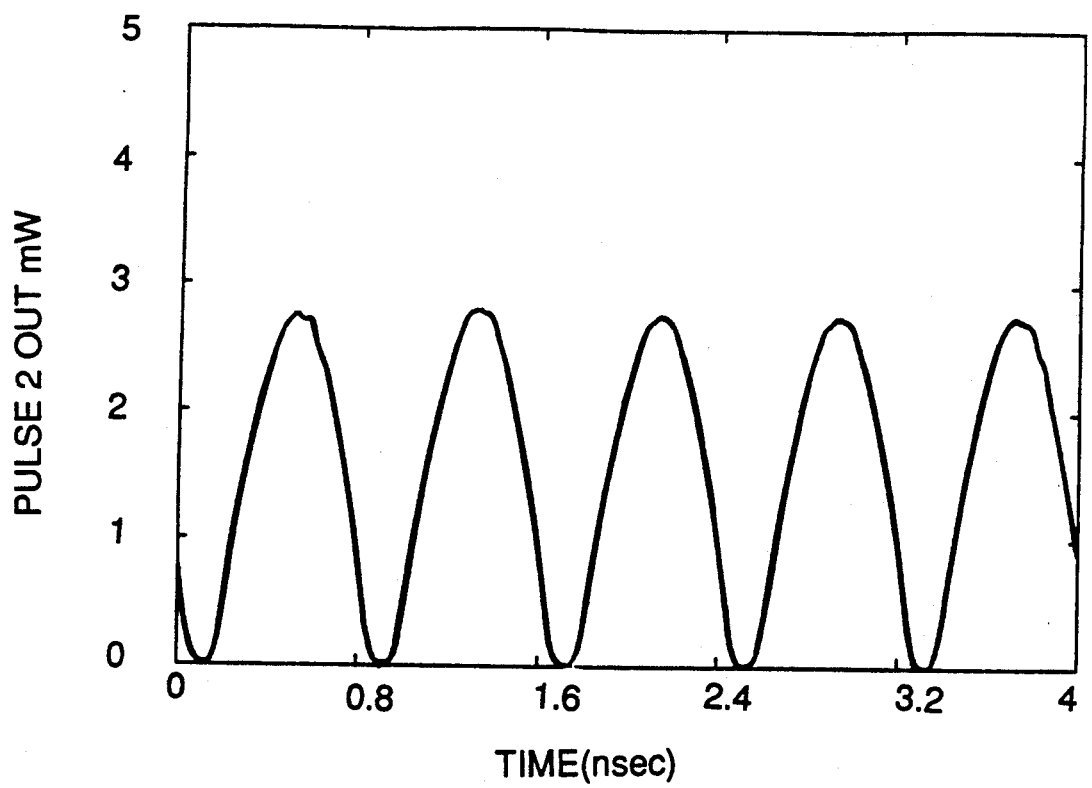
Figure 15:
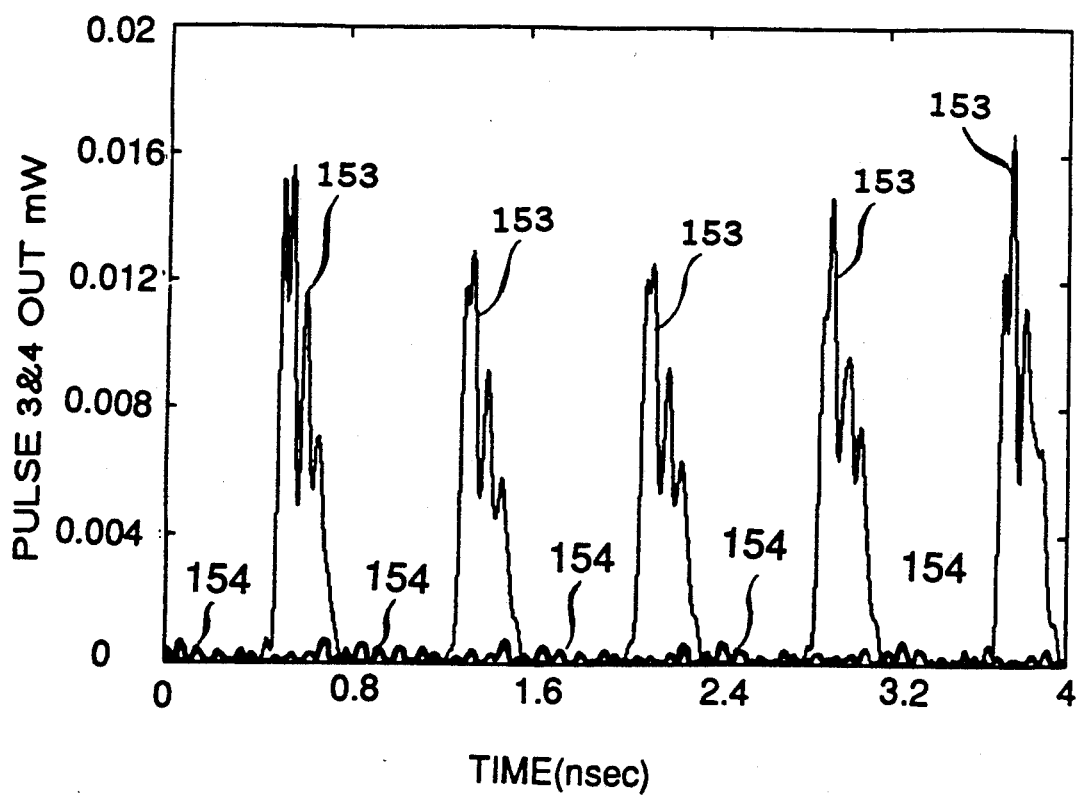

FIGS. 13 through 15 show the results of transmitting the same alternating sequences of "zeros" and "ones" described above over the same optical fiber length as described above. For these figures, the interchannel separation is chosen to be approximately 3 nm with channel 1 positioned approximately 1.5 nm below the zero dispersion frequency in the regime of normal dispersion. In terms of frequency, channels 1 and 2 are approximately 200 GHz 600 GHz, respectively, above the zero dispersion frequency. As a result, the intermodulation sideband channels 3 and 4 occur 200 GHz below and 1000 GHz above the zero dispersion frequency, respectively. Output pulses in channels 1 and 2 are shown in FIGS. 13 and 14, respectively. While the pulses have undergone some dispersion, the cross interaction of the pulses in the two channels does not seem to have had any noticeable effect. The spurious pulses in the intermodulation sidebands at frequencies $f_3$ and $f_4$ are shown in FIG. 15. Pulses labeled as curves 153 correspond to pulses in the lower intermodulation sideband at carrier frequency $f_3$ whereas very low level pulses labeled as curves 154 correspond to pulses in the upper intermodulation sideband at carrier frequency $f_4$.

Figure 16:
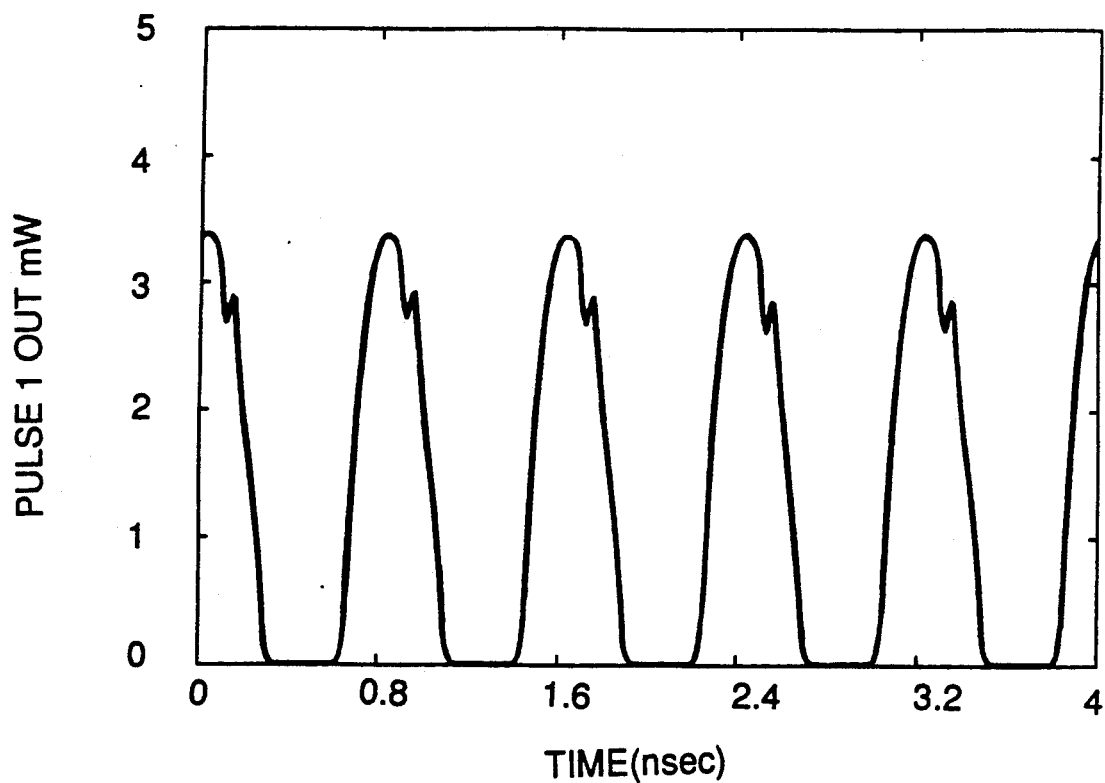
Figure 17:
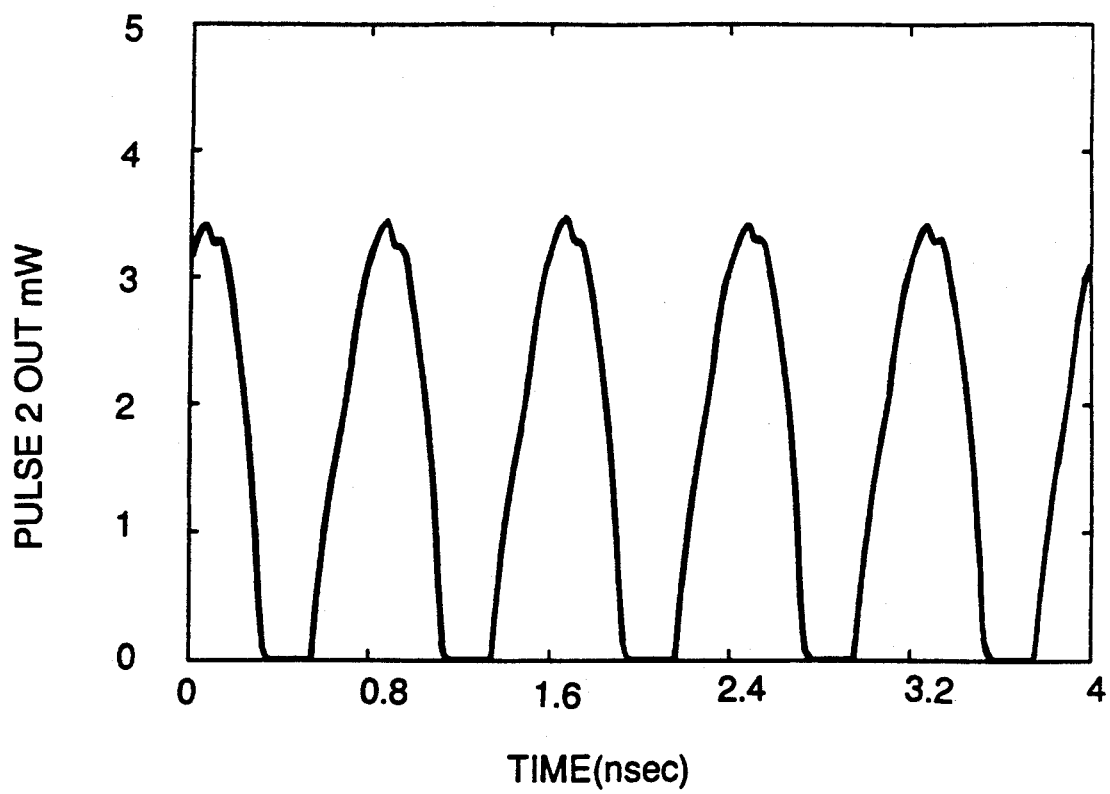
Figure 18:
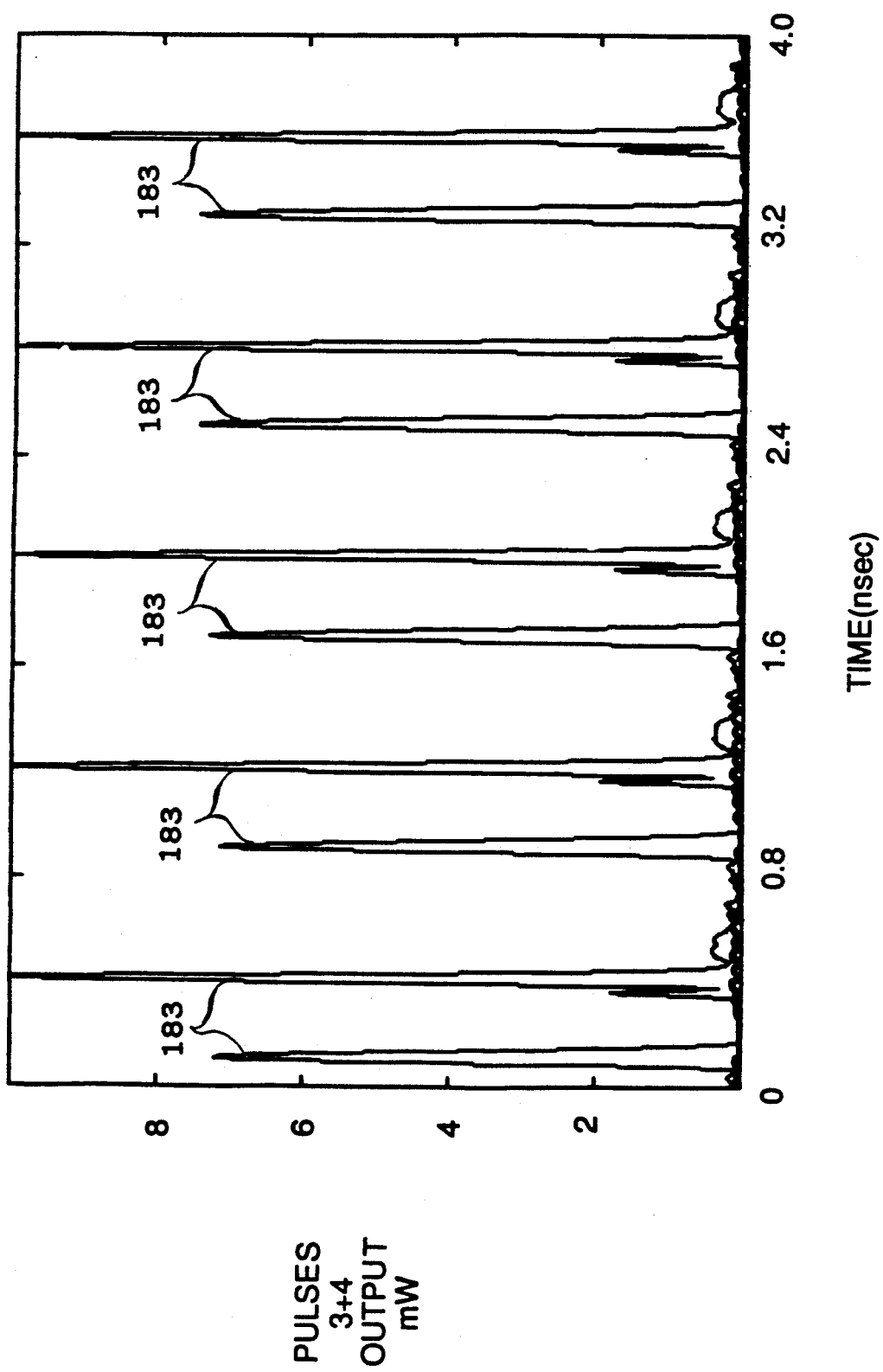
Figure 19:
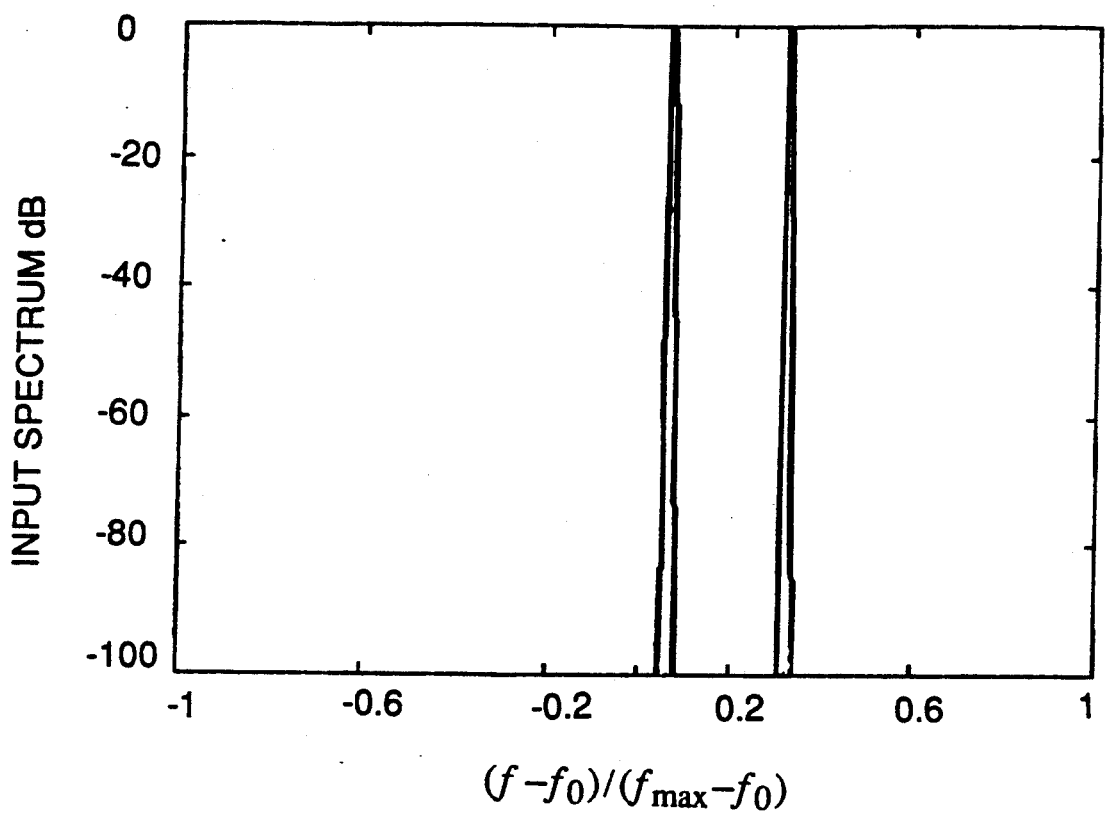
FIGS. 19 and 20 show input and output spectra, respectively, for the signals described in FIG. 6 and FIGS. 16 through 18.
Figure 20:
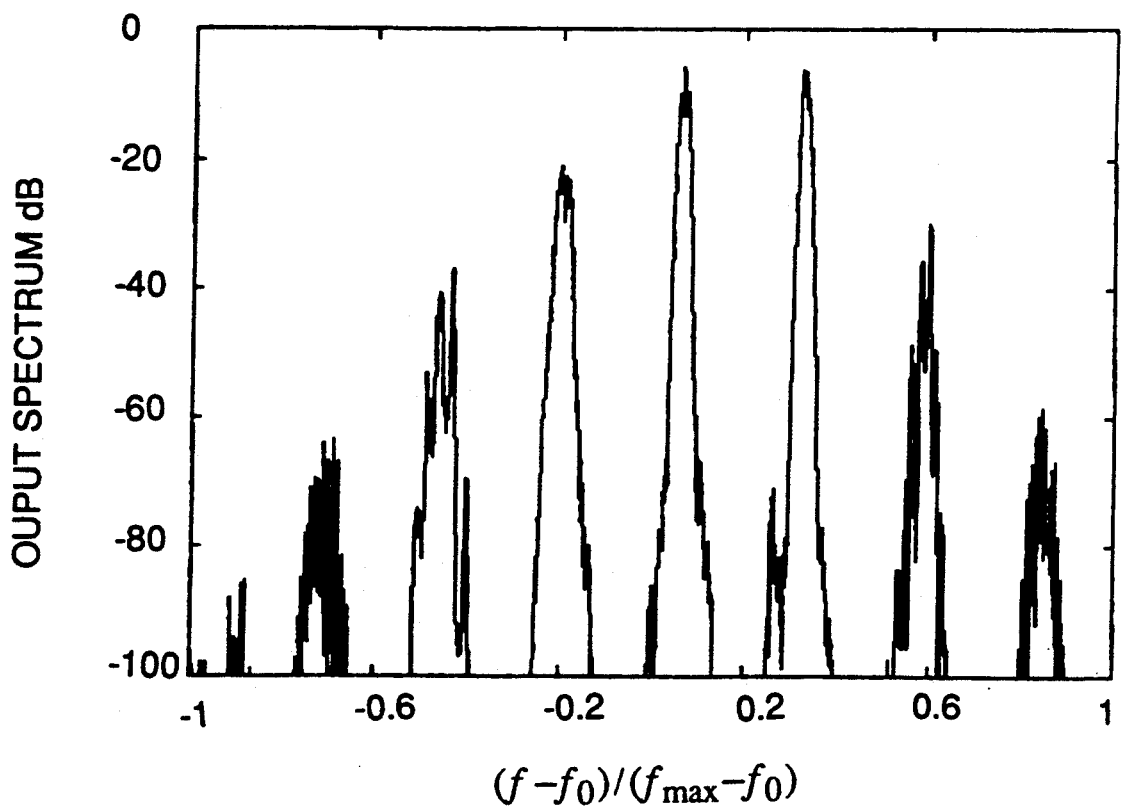

By moving both channels closer together and closer to the zero dispersion wavelength, it is possible to compare the results with those shown in FIGS. 13 through 15. For interchannel separation of 2 nm and separation of 0.5 nm for channel 1 from the zero dispersion wavelength, using the simulated two-channel WDM lightwave communication system described above, it is possible to obtain output pulses as shown in FIGS. 16 through 18. In terms of frequency, channels 1 and 2 are approximately 66.67 GHz and 333.3 GHz, respectively, above the zero dispersion frequency. As a result, the intermodulation sideband channels 3 and 4 occur 200 GHz below and 600 GHz above the zero dispersion frequency, respectively. Output pulses for channels 1 and 2 are shown in FIGS. 16 and 17, respectively. Output pulses for the intermodulation sidebands are shown in FIG. 18. Output pulses for the lower (at $f_3$) intermodulation sideband are labeled as curves 183. Output pulses (not labeled) for the upper (at $f_4$) intermodulation sideband appear as a very low, almost indiscernible ripple along the time axis at the bottom of FIG. 18. Input and output frequency spectra for the signals shown in FIGS. 16 through 18 are shown in FIGS. 19 and 20. Clearly, as seen in FIG. 20, the intermodulation sidebands are at significantly lower levels when the WDM communication system is designed in accordance with the principles of the invention.

In the description above, the laser diode has been shown as a CW source tuned to a carrier wavelength and modulated externally. It should be understood by those persons of ordinary skill in the art that many other embodiments will accomplish the function of placing data signals on a carrier at wavelength, $\lambda_i$. For example, distributed feedback (DFB) and distributed Bragg reflector (DBR) lasers are well adapted for generating lightwave signals at a single predetermined wavelength. Both DFB and DBR lasers are capable of tunable operation and direct or external modulation.

In the simulation results provided above, ASK modulation was described as the type modulation applied in each channel transmitter. It should be understood that other types of modulation such as FSK and PSK are contemplated for use in the multi-channel WDM lightwave communication system defined in accordance with the principles of the invention.

In general, external modulation has been described as a preferred modulation technique in order to avoid the effects of nonuniform FM response and the like. In practice, optical coupling of the laser source to the external modulator is accomplished with standard lens or butt coupling techniques which maximize coupling efficiency. Isolators placed between the laser and the modulator reduce unwanted reflections back into the laser.

While DFB and DBR lasers may be set to operate at a particularly desirable wavelength in accordance with the teachings of the invention herein, it may be desirable, although not necessary, to add a standard stabilization element to the laser. Stabilization elements, generally configured as control loops, are well known in the art for monitoring the signal output from the laser and responsively adjusting the current or temperature of the laser to correct any wavelength deviations from the desired wavelength.

In the description above, optical fiber 108 has been described as having a substantially uniform dispersion characteristic over its entire length. Since random fluctuations may occur in the dispersion characteristic of the optical fiber, it is understood that the carrier wavelength is offset from the mean zero dispersion wavelength.

While a uniform dispersion characteristic over the entire fiber length is desirable, it may not be practical. Therefore, it is also contemplated that optical fiber 108 comprises a plurality of fiber sections wherein each fiber section has a substantially uniform dispersion characteristic over the length of the particular section but the dispersion characteristics for the plurality of sections are different. In this case, channel 1 has its carrier wavelength set to the mean zero dispersion wavelength for the entire combination of fiber sections in fiber 108 provided that the dispersion in any section does not equal zero at or within 0.4 nm of the mean zero dispersion wavelength for a substantially continuous length greater than the beat length defined as $$\Lambda_3 = \frac{2\pi}{|2\beta_1 - \beta_2 - \beta_3|}.$$

where $\beta_i$ is the propagation constant in optical fiber 108 at wavelength $\lambda_i$.

For the earlier described condition of substantially uniform dispersion over the entire fiber length where random fluctuations tend to cause the dispersion of the fiber to be zero at or within 0.4 nm of the carrier wavelength for channel 1, the condition should exist for a substantially continuous length less than the beat length as defined above.

I claim:

1. Transmitter apparatus for generating lightwave signals to be wavelength-division-multiplexed in an optical fiber having a mean zero dispersion wavelength associated therewith, said transmitter apparatus comprising at least first and second channel transmitters, each transmitter including a light source and a modulating means optically coupled together, each said light source for generating a lightwave signal substantially at a carrier wavelength, said carrier wavelength for said first channel transmitter being at least 0.4 nm below said zero dispersion wavelength, a difference between said carrier wavelengths for said at least first and second channel transmitters being both greater than or equal to 2 nm and less than or equal to 3 nm.

2. The transmitter apparatus as defined in claim 1 wherein each transmitter includes means for modulating said lightwave signal in response to a supplied channel data signal.

3. The transmitter apparatus as defined in claim 2 wherein said means for modulating performs modulation in accordance with a method selected from the group consisting of ASK, FSK, and PSK.

4. The transmitter apparatus as defined in claim 2 further including means connected to said at least first and second channel transmitters for combining lightwave signals from each said channel transmitter into a single wavelength-division-multiplexed lightwave signal.

5. The transmitter apparatus as defined in claim 1 or 2 wherein said light source of said first channel transmitter generates lightwave signals at said carrier wavelength being coincident with or less than 0.4 nm away from said mean zero dispersion wavelength over any substantially continuous distance less than the beat length defined as $$\Lambda_3 = \frac{2\pi}{|2\beta_1 - \beta_2 - \beta_3|}.$$

where $\beta_1$ and $\beta_2$ are propagation constants in the optical fiber at the carrier wavelengths $\lambda_1$ and $\lambda_2$ of the first and second channel transmitters, respectively, and $\beta_3$ is the propagation constant in the optical fiber at a wavelength equal to $$\frac{\lambda_1 \lambda_2}{2\lambda_2 - \lambda_1}.$$

6. A lightwave system comprising transmitter apparatus and optical fiber coupled thereto for transmitting lightwave signals in an N-channel wavelength-division-multiplexed format in said fiber, N being a positive integer greater than or equal to 2, said optical fiber having means zero dispersion at a predetermined wavelength, said transmitter apparatus comprising at least first and second channel transmitters, each transmitter including a light source and a modulating means optically coupled together, each said light source for generating a lightwave signal substantially at a carrier wavelength, said carrier wavelength for said first channel transmitter being at least 0.4 nm below said zero dispersion wavelength, a difference between said carrier wavelengths for said at least first and second channel transmitters being both greater than or equal to 2 nm and less than or equal to 3 nm.

7. The lightwave system as defined in claim 6 wherein each transmitter includes means for modulating said lightwave signal in response to a supplied channel data signal.

8. The lightwave system as defined in claim 7 wherein said means for modulating performs modulation in accordance with a method selected from the group consisting of ASK, FSK, and PSK.

9. The lightwave system as defined in claim 8 further including means connected to said at least first and second channel transmitters for combining lightwave signals from each said channel transmitter into a single wavelength-division-multiplexed lightwave signal.

10. The lightwave system as defined in claim 6 or 7 wherein said light source of said first channel transmitter generates lightwave signals at said carrier wavelength being coincident with or less than 0.4 nm away from said mean zero dispersion wavelength over any substantially continuous distance less than the beat length defined as $$\Lambda_3 = \frac{2\pi}{|2\beta_1 - \beta_2 - \beta_3|}.$$

where $\beta_1$ and $\beta_2$ are propagation constants in the optical fiber at the carrier wavelengths $\lambda_1$ and $\lambda_2$ of the first and second channel transmitters, respectively, and $\beta_3$ is the propagation constant in the optical fiber at a wavelength equal to $$\frac{\lambda_1 \lambda_2}{2\lambda_2 - \lambda_1}.$$

* * * * *